US009086297B2

(12) United States Patent
Haleem

(10) Patent No.: US 9,086,297 B2
(45) Date of Patent: Jul. 21, 2015

(54) NAVIGATION SYSTEM HAVING MANEUVER ATTEMPT TRAINING MECHANISM AND METHOD OF OPERATION THEREOF

(75) Inventor: Ambreen Haleem, Sunnyvale, CA (US)

(73) Assignee: TELENAV, INC., Sunnyvale, CA (US)

(*) Notice: Subject to any disclaimer, the term of this patent is extended or adjusted under 35 U.S.C. 154(b) by 249 days.

(21) Appl. No.: 13/010,648

(22) Filed: Jan. 20, 2011

(65) Prior Publication Data

US 2012/0191343 A1 Jul. 26, 2012

(51) Int. Cl.
*G06F 7/00* (2006.01)
*G01C 21/36* (2006.01)
*G08G 1/0969* (2006.01)
*G09B 9/042* (2006.01)
*G09B 19/16* (2006.01)
*G01C 21/34* (2006.01)

(52) U.S. Cl.
CPC ........ *G01C 21/3697* (2013.01); *G01C 21/3407* (2013.01); *G01C 21/3415* (2013.01); *G01C 21/3461* (2013.01); *G01C 21/3484* (2013.01); *G08G 1/0969* (2013.01); *G09B 9/042* (2013.01); *G09B 19/167* (2013.01)

(58) Field of Classification Search
CPC ... B60W 30/00; B60W 50/082; B60W 40/09; B60W 2050/0075; B60W 2540/18; B60W 2520/10; B60W 2520/105; B60W 2520/125; B60W 2540/10; B60W 2510/182; G01C 21/3484; G01C 21/3697; G01C 1/0969; G01C 21/3407; G01C 21/3461; G01C 21/3415; G09B 19/167; G09B 9/042

USPC ................ 434/29, 62–71; 701/200, 201, 400, 701/408–416, 436–440
See application file for complete search history.

(56) References Cited

U.S. PATENT DOCUMENTS

| | | | |
|---|---|---|---|
| 6,227,862 B1* | 5/2001 | Harkness | 434/65 |
| 6,714,894 B1 | 3/2004 | Tobey et al. | |
| 6,810,328 B2 | 10/2004 | Yokota et al. | |
| 7,565,230 B2 | 7/2009 | Gardner et al. | |
| 2002/0120371 A1 | 8/2002 | Leivian et al. | |
| 2006/0057543 A1 | 3/2006 | Roald | |
| 2007/0213886 A1* | 9/2007 | Zhang et al. | 701/1 |
| 2009/0157294 A1 | 6/2009 | Geelen et al. | |
| 2010/0030464 A1* | 2/2010 | Mittermaier | 701/201 |
| 2010/0055649 A1* | 3/2010 | Takahashi et al. | 434/66 |
| 2010/0209881 A1* | 8/2010 | Lin et al. | 434/65 |
| 2010/0209882 A1* | 8/2010 | Lin et al. | 434/65 |
| 2010/0209884 A1* | 8/2010 | Lin et al. | 434/65 |
| 2010/0209886 A1* | 8/2010 | Lin et al. | 434/65 |
| 2010/0209890 A1* | 8/2010 | Huang et al. | 434/65 |
| 2010/0209891 A1* | 8/2010 | Lin et al. | 434/66 |
| 2010/0209892 A1* | 8/2010 | Lin et al. | 434/71 |
| 2010/0332080 A1* | 12/2010 | Bae | 701/42 |

FOREIGN PATENT DOCUMENTS

JP   2009115717 A   5/2009

\* cited by examiner

*Primary Examiner* — John Q Nguyen
*Assistant Examiner* — Jordan S Fei
(74) *Attorney, Agent, or Firm* — IP Investment Law Group

(57) ABSTRACT

A method of operation of a navigation system includes: generating a maneuver instruction for a driving maneuver, the maneuver instruction including an explanation of how to turn, merge, park or operate a driver's vehicle; monitoring a maneuver attempt for a compliance to the maneuver instruction; modifying the maneuver instruction based on the maneuver attempt; assigning a driver skill grade for the maneuver attempt based on the compliance to the maneuver instruction; and generating a training feedback to improve the driver skill grade of the maneuver attempt for displaying on a device.

20 Claims, 8 Drawing Sheets

NAVIGATION SYSTEM HAVING MANEUVER ATTEMPT TRAINING MECHANISM AND METHOD OF OPERATION THEREOF

TECHNICAL FIELD

The present invention relates generally to a navigation system and more particularly to a system for maneuver attempt training mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone or a personal digital assistant (PDA).

Location based services allow users to create, transfer, store, and/or consume information that affects the "real world". One such use of location-based services is to provide increased safety features for vehicles.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information, when available or in service areas.

In response to consumer demand, navigation systems are providing ever-increasing functionality. Current navigations systems lack features that educate drivers and improve driver skills. The lack of these features entails safety risks. Tools that can educate drivers and improve driver skills can decrease accidents and reduce costs.

Thus, a need still remains for a navigation system having maneuver attempt training mechanism providing low cost, improved functionality, and improved reliability. In view of the ever-increasing need to save costs and improve efficiencies, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a maneuver instruction for a driving maneuver, the maneuver instruction including an explanation of how to turn, merge, park or operate a driver's vehicle; monitoring a maneuver attempt for a compliance to the maneuver instruction; modifying the maneuver instruction based on the maneuver attempt; assigning a driver skill grade for the maneuver attempt based on the compliance to the maneuver instruction; and generating a training feedback to improve the driver skill grade of the maneuver attempt for displaying on a device.

The present invention provides a navigation system, including: an instruction module, for generating a maneuver instruction for a driving maneuver, the maneuver instruction including an explanation of how to turn, merge, park or operate a driver's vehicle; a monitor module, coupled to the instruction module, for monitoring a maneuver attempt for a compliance to the maneuver instruction; a modify module, coupled to the monitor module, for modifying the maneuver instruction based on the maneuver attempt; a grade module, coupled to the modify module, for assigning a driver skill grade for the maneuver attempt based on the compliance to the maneuver instruction; and a feedback module, coupled to the grade module, for generating a training feedback to improve the driver skill grade of the maneuver attempt for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
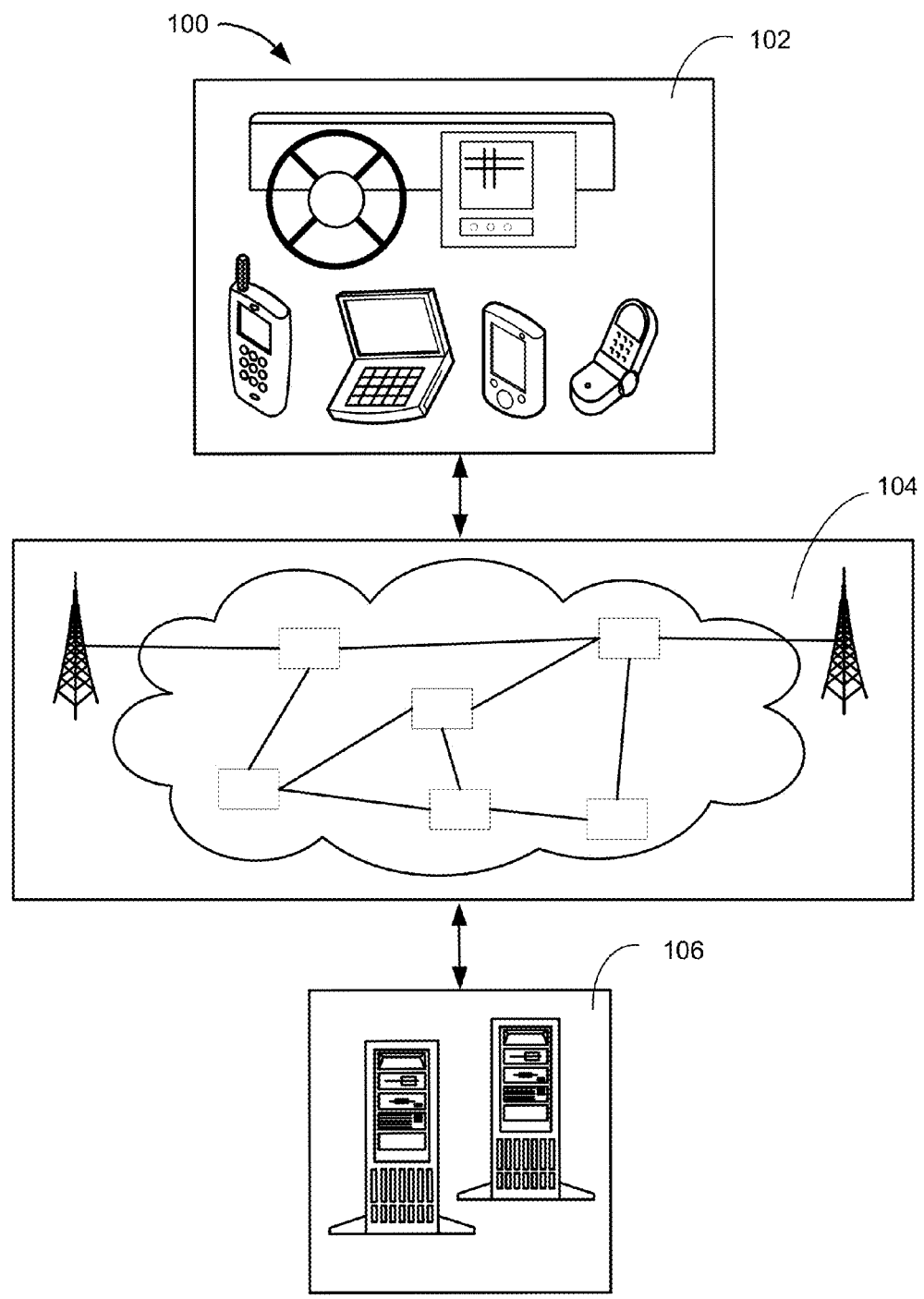
FIG. 1 is a navigation system with maneuver attempt training mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with maneuver attempt training mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telemetric navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
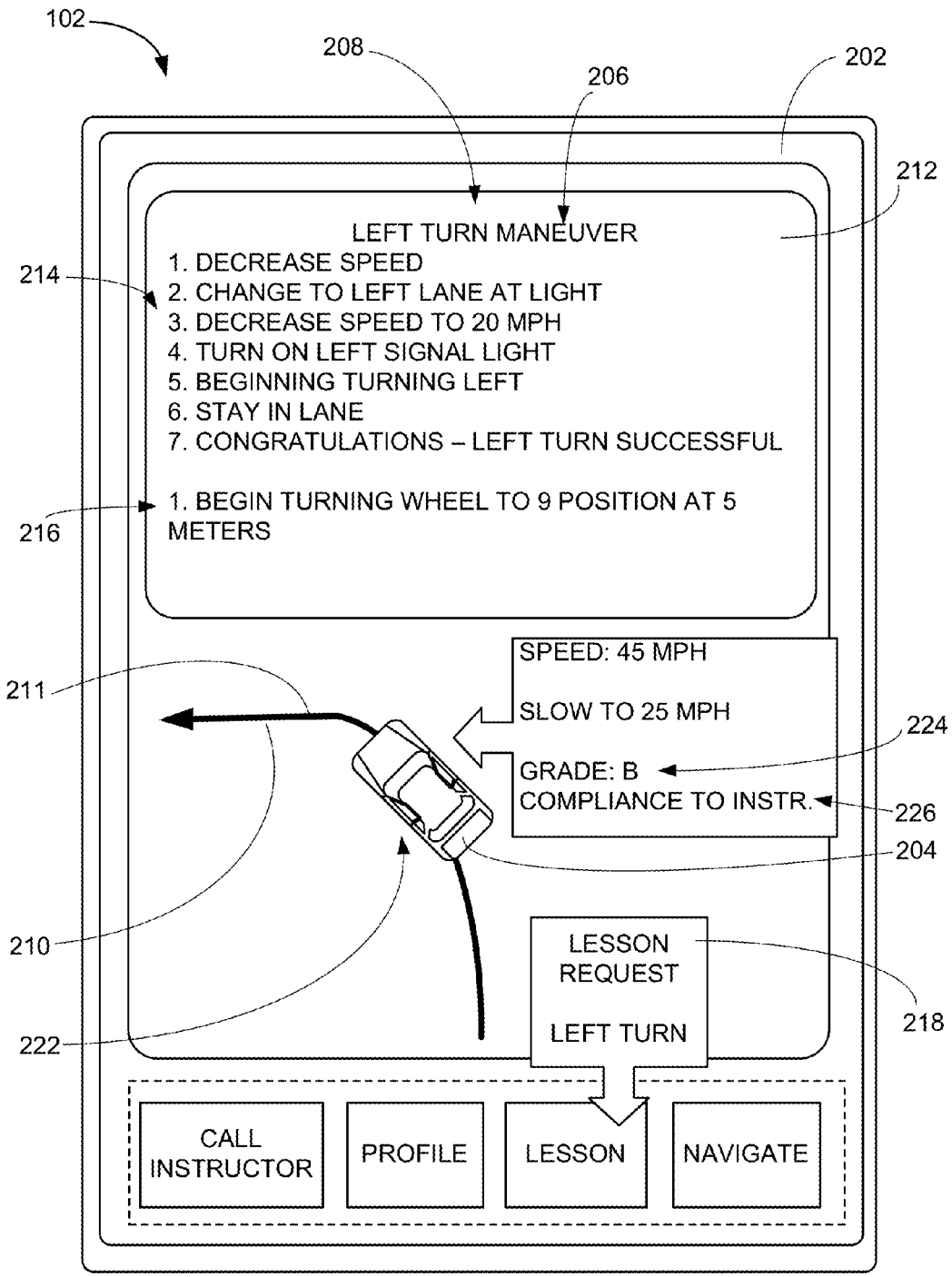
FIG. 2 is a first example of a display interface of the first device.

Referring now to FIG. 2, therein is shown a first example of a display interface 202 of the first device 102. The display interface 202 can depict a driver's vehicle 204 making a left turn. The driver's vehicle 204 is defined as a vehicle equipped with the first device 102, such as a portable or built in navigation system.

A driving maneuver 206 is defined as the act of steering, maneuvering, or operating a vehicle to interact with the road or traffic. The driving maneuver 206 can include operating or maneuvering the driver's vehicle in a left turn, a right turn, U-turn, lane-changes, reversing, merging, and yielding to traffic. The driving maneuver 206 can also include operating the driver's vehicle 204 to park including parallel parking, parking on a hill, and parking in a straight parking spot from a turn.

A turn maneuver 208 is defined as the driving maneuver 206 that involves a turn. For example, the turn maneuver 208 can include a right turn, a left turn, a U-turn, and a three-point turn.

A travel route 210 is defined as a course, path, or way for navigating to a destination. The navigation system 100 can generate the travel route 210 for a driver to travel from one location to another location. The travel route 210 from one location to another location can include the driving maneuver 206 such as turns, curves, merges, lane-changes, and parking at the end of the travel route 210.

A practice route 211 is defined as a course, path, or way that is generated for the driver to practice specific examples of the driving maneuver 206. The practice route 211 is not used for navigating to a destination but is used to practice different examples of the driving maneuver 206. For example, the driver can use the practice route 211 to practice a series of right and left turns, U-turns, merges, yields, lane changes, or a combination thereof.

A maneuver instruction 212 is defined as an instruction to perform the driving maneuver 206. For example, the maneuver instruction 212 can include guidance on completing the driving maneuver 206. For example, the navigation system 100 can instruct the driver to complete a left turn: "begin slowly turning the steering wheel left as you proceed into the intersection at twenty miles per hour" as an audio instruction.

The maneuver instruction 212 can be modeled after recommendations and recorded performances from professional driving instructors. For example, the maneuver instruction 212 can be instructions based on how a professional driving instructor would perform the driving maneuver 206.

The maneuver instruction 212 for the driving maneuver 206 can include instructions for where to position the vehicle during the driving maneuver 206. The maneuver instruction 212 can also include instructions on how fast the vehicle should be traveling during the driving maneuver 206. The maneuver instruction 212 can also include instructions on when to gear shifts, steering techniques and braking technique during the driving maneuver 206.

The maneuver instruction 212 can be instructions in text or audio prompts. The maneuver instruction 212 can include instruction and guidance on vehicle speed, steering, trailing distance between cars, and braking. The navigation system 100 can also generate the maneuver instruction 212 to have more detail or less detail based on the experience of the driver.

A brand new driver, an intermediate level driver, and an expert driver can receive a different version of the maneuver instruction 212 with different content that is customized to the driver's experience level. The maneuver instruction 212 for the expert driver can include instructions on advanced driving techniques. For example, the maneuver instruction 212 for expert drivers can include instructions on how to position the vehicle in a sharp turn at the fastest speed possible.

The navigation system 100 can adjust the frequency and pace of communicating the maneuver instruction 212 to the driver. A novice driver can receive more or less instructions based on the comfort level of the driver. For example, the navigation system 100 can deliver a less detailed version of the maneuver instruction 212 to the novice driver to avoid distracting the driver as the driver focuses on learning to drive.

The maneuver instruction 212 can include a basic instruction 214 and a location-specific instruction 216. The basic instruction 214 is defined as a general instruction for all maneuvers of the same type such as instructions that apply to all left turns. For example, the basic instruction 214 for all left turns can include: "Please continue, remaining in your lane. Gradually reduce speed before the start of the turn. Begin turning the steering wheel to the left".

The location-specific instruction 216 is defined as the maneuver instruction 212 specifically generated for the driving maneuver 206 at a specific location on the travel route 210. For example, the location-specific instruction 216 can be generated for a specific left turn at the corner of "Main Street and Second Street while heading north". The navigation system 100 can use navigation and geographic information from the travel route 210 to generate the location-specific instruction 216.

For example, the navigation system 100 can identify location-specific geographic features for the specific left turn and incorporate the features into the maneuver instruction 212. If the left turn at "Main Street" includes a center turn lane, the location-specific instruction 216 can instruct the driver to pull into the center turn lane as one of the instructions for completing the left turn at "Main Street".

A lesson request 218 is defined as a request for a specific type of the driving maneuver 206. For example, the driver can input the lesson request 218 for left turns. The navigation system 100 can generate the maneuver instruction 212 of a left-turn for the driver to practice left turns. The driver can also request parallel parking as the lesson request 218. The navigation system 100 can generate the maneuver instruction 212 of parallel parking for the driver to practice.

A maneuver attempt 222 is defined as the driver's performance of the driving maneuver 206. The navigation system 100 can monitor the maneuver attempt 222 and identify how the performance of the maneuver attempt 222 conformed to the maneuver instruction 212. For example, the maneuver instruction 212 can instruct the driver to approach a turn at fifteen to twenty miles per hour. The driver can approach the turn at fifty miles per hour. The navigation system 100 can assign a driver skill grade 224 to the maneuver attempt 222 based on how much the maneuver attempt 222 deviated from the guidelines of the maneuver instruction 212.

The driver skill grade 224 is defined as a grade or rating assigned to the maneuver attempt 222. The driver skill grade 224 can include the grades of "A", "B", "C", "D", and "F" as examples of grades. The driver skill grade 224 can be based on how closely the maneuver attempt 222 conformed to the instructions and guidelines of the maneuver instruction 212 for each stage of the driving maneuver 206.

For example, if the maneuver attempt 222 conformed to the guidelines and instructions from the maneuver instruction 212, the driver skill grade 224 can be "A", "B", or "C". In this example, the driver could have conformed to the recommended speed and performed all the steps included in the maneuver instruction 212. If the maneuver attempt 222 deviated or failed to complete the instructions from the maneuver instruction 212, the driver skill grade 224 for the maneuver attempt 222 can be "D" or "F".

A compliance 226 is defined as a situation where the maneuver attempt 222 satisfies pre-determined minimal requirements or mandatory steps of the maneuver instruction 212 for the driving maneuver 206. For example, the maneuver instruction 212 can include mandatory steps and optional steps for completing a left turn. The compliance 226 to the maneuver instruction 212 occurs when the driver completes the mandatory steps of the maneuver instruction 212.

An example of a mandatory step can be to make a complete stop at a red light. An example of an optional step can be to slow down to twenty miles per hour during a turn. The driver's completion of mandatory steps and optional steps can determine the driver skill grade 224 for the maneuver attempt 222 and the compliance 226.

For example, the driver skill grade 224 of "A", "B", and "C" for the maneuver attempt 222 can represent the compliance 226 of the maneuver instruction 212. If the driver completed all of the mandatory steps and optional steps of the maneuver instruction 212 with only slight deviations during the maneuver attempt 222, the navigation system 100 can assign the driver skill grade 224 of "A" to the maneuver attempt 222. The driver skill grade 224 of "A" qualifies as the compliance 226.

If a driver fails to complete a mandatory step of the maneuver instruction 212, the navigation system 100 can assign the driver skill grade 224 of "D" or "F". The driver skill grade 224 of "D" or "F" does not qualify as the compliance 226 to the maneuver instruction 212.

For example, the maneuver instruction 212 for a left turn can be to maintain at least a ten miles per hour speed during the maneuver. The driver can make a complete stop in the middle of an intersection while attempting the left turn. The maneuver attempt 222 of the left turn can be assigned the driver skill grade 224 of "F" because the driver failed to maintain at least a ten miles per hour speed and the driver created a hazardous situation in the middle of the intersection.

The compliance 226 can be used to inform the driver that the driving maneuver 206 was completed safely and successfully at the minimal requirements of the maneuver instruction 212. The driver skill grade 224 can inform the driver on how to further improve the maneuver attempt 222.

For example, an inexperienced driver can receive the driver skill grade 224 of "C" and still pass the minimal requirements of the maneuver instruction 212. Although the compliance 226 indicates that the driver successfully completed the driving maneuver 206, the driver skill grade 224 of "C" can inform the driver that the driver can improve their performance of the driving maneuver 206. The driver can practice the driving maneuver 206 to attempt to receive the driver skill grade 224 of "B" or "A" in the next maneuver attempt 222.

Figure 3:
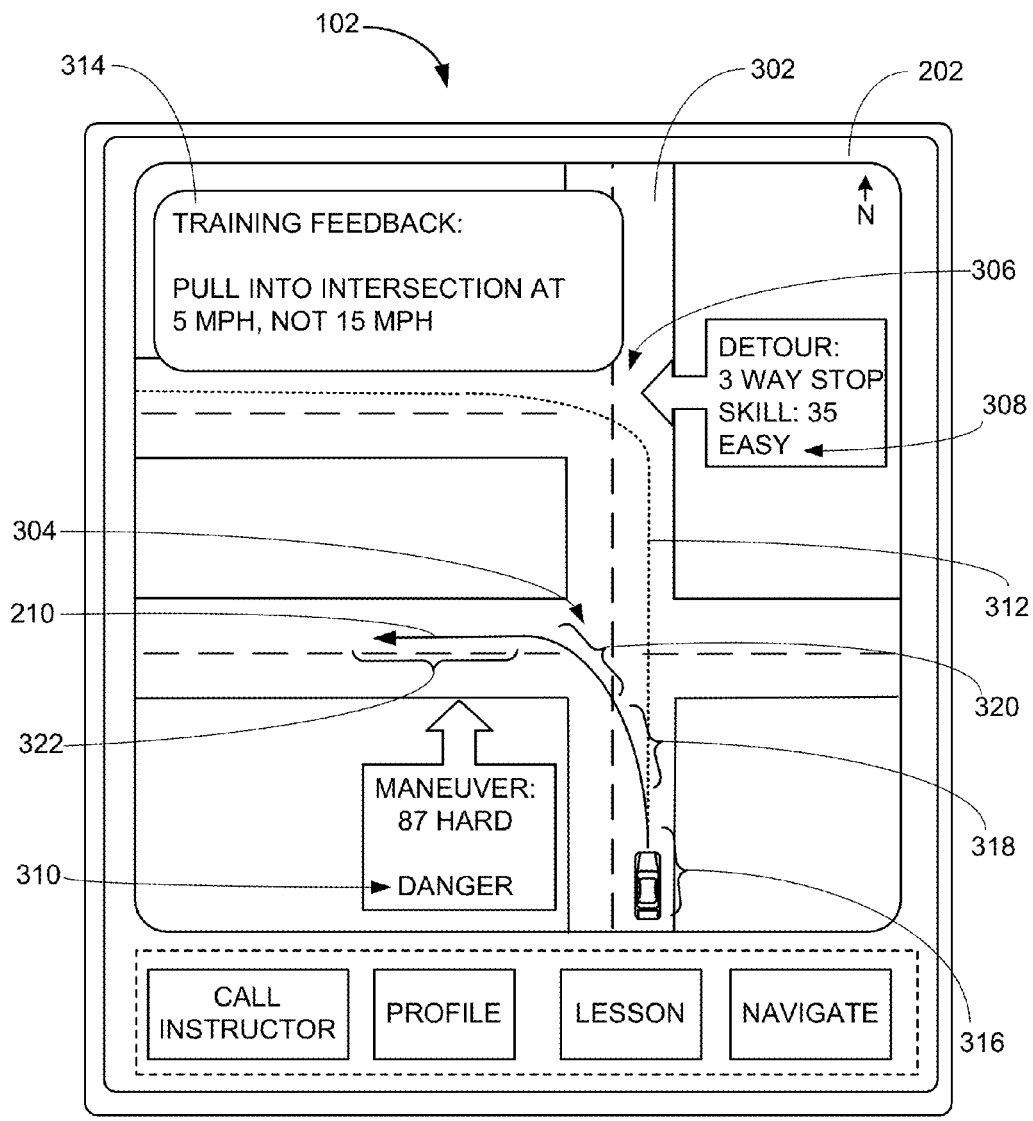
FIG. 3 is a second example of the display interface.

Referring now to FIG. 3, therein is shown a second example of the display interface 202. The display interface 202 can depict the driver's vehicle 204 traveling north along a road 302. The display interface 202 can also depict an unprotected left turn 304 and a three-way stop 306. The display interface 202 also depicts the driver's vehicle 204 following the travel route 210 toward the unprotected left turn 304.

The unprotected left turn 304 is defined as a left turn at an intersection without a left turn signal light. Vehicle's making the unprotected left turn 304 can make a left turn after oncoming traffic has passed through the traffic intersection. The three-way stop 306 is defined as a three-way intersection with stop signs at each intersection. Vehicles at an intersection with the three-way stop 306 must stop at one of the stop signs before traveling straight or turning at the three-way stop 306.

A maneuver difficulty 308 is defined as a difficulty rating for the driving maneuver 206. For example, the maneuver difficulty 308 for the driving maneuver 206 of FIG. 2 can be rated or classified as "hard", "medium", and "easy".

For example, the display interface 202 depicts the unprotected left turn 304. The maneuver difficulty 308 of the unprotected left turn 304 can be rated or classified as "hard" because of the dangers associated with making the unprotected left turn 304 against oncoming traffic. Many vehicles accidents occur at intersections with the unprotected left turn 304 because drivers can make a left turn into oncoming traffic and drivers do not check if the intersection is clear of traffic before making the turn.

Further, for example, the driving maneuver 206 of merging onto a crowded freeway with a short acceleration onramp can be rated as "hard" for the maneuver difficulty 308. The driving maneuver 206 of parallel parking can also be an example of the driving maneuver 206 with "hard" as the maneuver difficulty 308. The maneuver difficulty 308 can be based on the driver skill needed to complete the maneuver and the chances of hitting another vehicle or object during the maneuver.

The maneuver difficulty 308 of the three-way stop 306 can be rated or classified as "easy" because the driver's vehicle 204 is protected by the stop sign when turning left. The driving maneuver 206 of parking in a slanted parking spot can also be rated as "easy" for the maneuver difficulty 308 because the maneuver requires less skill to complete than a straight parking spot. The maneuver difficulty 308 of the driving maneuver 206 can also be based on user-generated ratings for the driving maneuver 206 and historical statistics about the driving maneuver 206.

A dangerous situation 310 is defined as a driving situation that may cause an accident or perhaps too difficult for the driver to complete successfully. For example, the unprotected left turn 304 can be the dangerous situation 310 because of the risks of collision with oncoming traffic.

A detour 312 is defined as an indirect way or course from the travel route 210. The navigation system 100 can generate the detour 312 to the travel route 210 to avoid the dangerous situation 310. The navigation system 100 can also generate the detour 312 to avoid the driving maneuver 206 with the maneuver difficulty 308 that is beyond the skill of the driver of the navigation system 100.

For example, a novice driver could have received an "F" for the driver skill grade 224 of FIG. 2 for the driving maneuver 206 for the unprotected left turn 304. The navigation system 100 can identify the maneuver difficulty 308 of the unprotected left turn 304 as "hard" and identify that the novice driver has an "F" for the driving maneuver 206.

The navigation system 100 can determine that the unprotected left turn 304 is the dangerous situation 310 because of the maneuver difficulty 308 and the driver skill grade 224 for the driving maneuver 206. The navigation system 100 can generate the detour 312 to the three-way stop 306 to avoid the dangerous situation 310. The navigation system 100 can increase the safety of driving conditions by routing inexperienced drivers around the dangerous situation 310.

A training feedback 314 is defined as suggestions, recommendations, or feedback for the driver to improve the driver's performance of the driving maneuver 206. For example, the driver can receive the driver skill grade 224 after completing the driving maneuver 206. The training feedback 314 can be suggestions or recommendations for the driver to follow to improve the driver skill grade 224 for the next time that the driver attempts the driving maneuver 206.

For example, the training feedback 314 can suggest to the driver to reduce the speed of the vehicle when attempting the driving maneuver 206 of turning left at an intersection. The training feedback 314 can inform the driver how the maneuver attempt 222 of FIG. 2 is deviating from the maneuver instruction 212 and provide an explanation of the assignment of the driver skill grade 224 for the driving maneuver 206 to the driver. The driver can study the training feedback 314 and follow the suggestions in subsequent attempts at the driving maneuver 206 to improve the driver skill grade 224 for the driving maneuver 206.

The navigation system 100 can generate and modify the maneuver instruction 212 of FIG. 2 at different stages of the driving maneuver 206. For example, the driving maneuver 206 can include an approaching stage 316, an entering stage 318, a middle stage 320, and an end stage 322 for different stages during the driving maneuver 206.

The approaching stage 316 is defined as the time period before the driver's vehicle 204 reaches the driving maneuver 206. For example, the approaching stage 316 for a turn can be the time period before the driver must begin turning the steering wheel to enter the turn.

The entering stage 318 is defined as the time period when the driver's vehicle 204 enters the driving maneuver 206. For example, the entering stage 318 for the driving maneuver 206 of parallel parking can be when the driver's vehicle 204 pulls up parallel to the other vehicle to begin parallel parking.

The middle stage 320 is defined as the time period after the driver's vehicle 204 has entered the driving maneuver 206. For example, the middle stage 320 can be the time period after entering a turn where the driver's vehicle 204 should accelerate to exit the turn. The end stage 322 is defined as the time period after the driver's vehicle 204 has concluded the driving maneuver 206.

Figure 4:
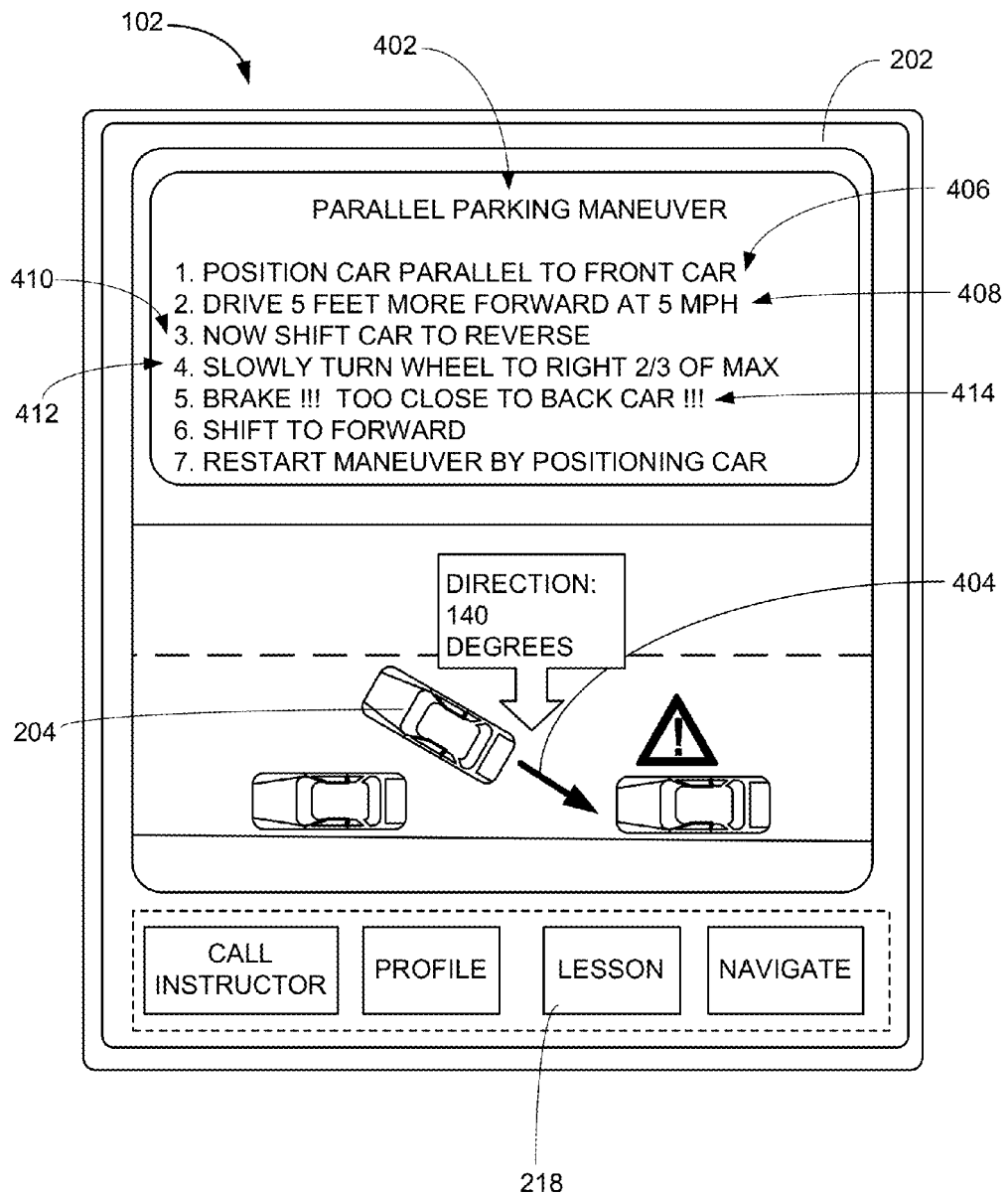
FIG. 4 is a third example of the display interface.

Referring now to FIG. 4, therein is shown a third example of the display interface 202. The display interface 202 depicts the driver's vehicle 204 attempting the driving maneuver 206 of FIG. 2 of parallel parking. Parallel parking is an example of a parking maneuver 402.

The parking maneuver 402 is defined as the driving maneuver 206 of parking. For example, the parking maneuver 402 can include: parallel parking, parking in a parking spot without turning, turning into a straight parking spot, turning into a slanted parking spot, and reversing into a parking spot.

A vehicle direction 404 is defined as the course or direction towards which the driver's vehicle 204 is traveling. The vehicle direction 404 can be indicated in terms of a three hundred and sixty degree scale with zero degrees indicating that the vehicle is facing north. The vehicle direction 404 can be used to assist drivers in steering the vehicle and the vehicle direction 404 can be displayed on the display interface 202. The vehicle direction 404 is similar to the current heading of the vehicle and the vehicle direction 404 also includes the direction that the vehicle is traveling when the vehicle is traveling in reverse.

The maneuver instruction 212 of FIG. 2 can be modified based on different components or attributes of performing the driving maneuver 206. For example, the different components of driving can include: the vehicle's position during the maneuver, the vehicle's speed, gear shifting, steering and braking. The maneuver instruction 212 can include a position recommendation 406, a speed recommendation 408, a gear shift recommendation 410, a steering recommendation 412, and a braking recommendation 414 as the different components of driving.

The position recommendation 406 is defined as instructions that modify the maneuver instruction 212 on the positioning of the vehicle direction 404 during the driving maneuver 206 to successfully complete the driving maneuver 206. For example, the position recommendation 406 can be instructions on where to position the driver's vehicle 204 at the approaching stage 316, the entering stage 318, the middle stage 320, and the end stage 322 of FIG. 3. The position recommendation 406 can be audio instructions, text instruction, or a combination thereof.

The position recommendation 406 can be communicated to the driver as a graphical representation of the position of the driver's vehicle 204 in relation to the street and nearby objects on the display interface 202. For example, the position recommendation 406 can be an animation of a model of the driver's vehicle 204 performing the driving maneuver 206 on the display interface 202. The animation of the position recommendation 406 can display the position of the driver's vehicle 204 in relationship to the road during the driving maneuver 206. The driver can also listen to audio instructions from the navigation system 100 and model the maneuver attempt 222 of FIG. 2 based on what is seen on the display interface 202.

The speed recommendation 408 is defined as instructions that modify the maneuver instruction 212 on the recommend speed for a vehicle during the driving maneuver 206. The maneuver instruction 212 can instruct the driver to enter the driving maneuver 206 at thirty miles per hour but the driver can be entering the maneuver below the recommended speed. The speed recommendation 408 can modify the maneuver instruction 212 for the driver to speed up or to slow down for the next stage of the driving maneuver 206.

For example, the vehicle's speed at the approaching stage 316 can be ten miles below the recommendation from the maneuver instruction 212. The speed recommendation 408 at the entering stage 318 can be instructions to increase the vehicle's speed by ten miles an hour as the vehicle transitions to the entering stage 318 of the driving maneuver 206.

Further, for example, the speed recommendation 408 can be "five miles per hour" for the driving maneuver 206 of parallel parking. If the driver's vehicle 204 is traveling at "fifteen miles per hour" in an attempt to parallel park, the speed recommendation 408 can be to slow down to "immediately reduce speed to five miles per hour".

The gear shift recommendation 410 is defined as instructions that modify the maneuver instruction 212 on gear shift timing of the driver's vehicle 204 during the driving maneuver 206. For example, the driver can deviate from the recommendations from the maneuver instruction 212 when shifting gears. The driver can shift into reverse for parallel parking before arriving in the correct position to begin the driving maneuver 206.

Further, for example, the driver can be downshifting or upshifting a manual transmission vehicle at inefficient times during the driving maneuver 206 such as a turn. The gear shift recommendation 410 can be a prompt based on the revolutions per minute of the vehicle's engine to shift gears based on the maneuver attempt 222. The gear shift recommendation 410 can also be instructions to downshift and slow down the vehicle during the entering stage 318 of a turn based on the vehicles speed when approaching the driving maneuver 206.

The steering recommendation 412 is defined as instructions that modify the maneuver instruction 212 on steering the driver's vehicle 204 during the driving maneuver 206. For example, the steering recommendation 412 can be instructions on how far to turn the steering wheel during the parking maneuver 402 of parallel parking. The maneuver instruction 212 can instruct the driver to turn the steering wheel so that the vehicle direction 404 of the vehicle is one hundred and forty degrees. The driver can turn the steering wheel to one hundred degrees and begin the parking maneuver 402. The steering recommendation 412 can instruct the driver to turn the steering wheel an additional forty degrees before attempting the maneuver.

Further, for example, the steering recommendation 412 can be instructions on which direction to turn the steering vehicle of the driver's vehicle 204 when in reverse gear. The steering recommendation 412 can also instruct the driver of on how to steer the vehicle through high speed turns and curves to avoid under-steer of the vehicle or over-steer of the vehicle during the turn maneuver 208 of FIG. 2.

Under-steer is a handling characteristic of an automotive vehicle that causes it to turn less sharply than the driver intends because the front wheels slide to the outside of the turn before the rear wheels lose fraction. Over-steer is the handling of an automotive vehicle that causes turns that are sharper than the driver intends because the rear wheels slide to the outside of the turn before the front wheels lose traction. Both under-steer and over-steer can be corrected by turning the steering wheel to compensate for loss of traction. The navigation system 100 can give instructions on how to turn the steering wheel during these situations.

The braking recommendation 414 is defined as instructions that further modify the maneuver instruction 212 on braking during the driving maneuver 206. For example, the braking recommendation 414 can be instructions on when to start braking for the driving maneuver 206 of a sharp turn at a high speed. The braking recommendation 414 can be to "gently tap the brakes" or "to press firmly on the brakes". Further, for example, the braking recommendation 414 can be at the approaching stage 316, the entering stage 318, the middle stage 320, and the end stage 322 of the turn maneuver 208 to help complete the turn.

Figure 5:
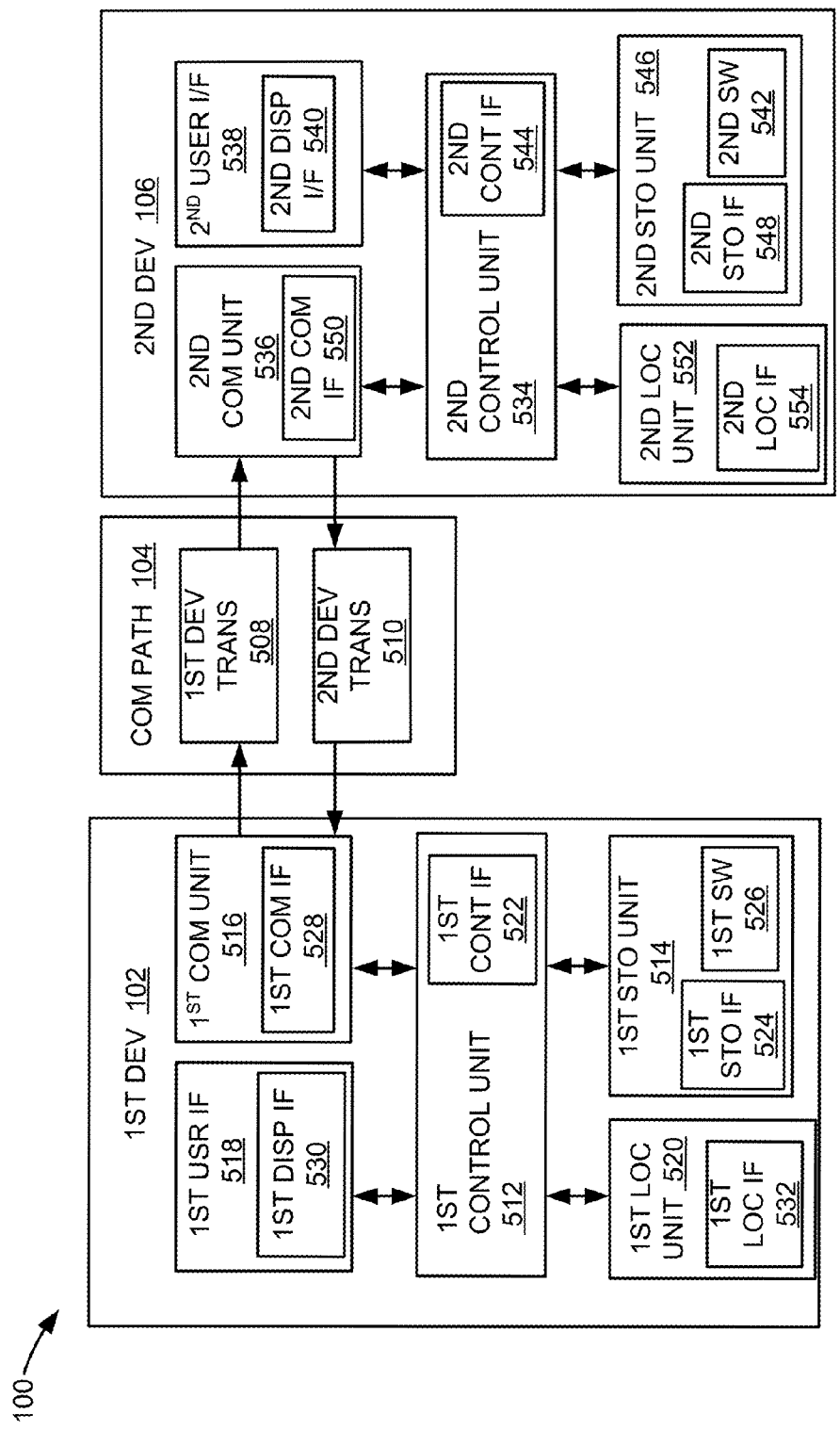
FIG. 5 is an exemplary block diagram of the navigation system.

Referring now to FIG. 5, therein is shown an exemplary block diagram of the navigation system 100. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a first location unit 520. The first device 102 of FIG. 5 can be similarly described by the first device 102 of FIG. 1.

The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first location unit 520 can generate location information, current heading, and current speed of the first device 102, as examples. The first location unit 520 can be implemented in many ways. For example, the first location unit 520 can function as at least a part of a global positioning system (GPS), an inertial navigation system, a cellular-tower location system, a pressure location system, or any combination thereof.

The first location unit 520 can include a first location interface 532. The first location interface 532 can be used for communication between the first location unit 520 and other functional units in the first device 102. The first location interface 532 can also be used for communication that is external to the first device 102.

The first location interface 532 can receive information from the other functional units or from external sources, or can transmit information to the other functional units or to external destinations. The external sources and the external destinations refer to sources and destinations external to the first device 102.

The first location interface 532 can include different implementations depending on which functional units or external units are being interfaced with the first location unit 520. The first location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the first location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. Examples of the first display interface 530 can include the display interface 202 of FIG. 2. The first display interface 530 can include a display, a projector, a video screen, a speaker, or any combination thereof. The screenshot shown on the display interface 202 described in FIG. 2 can represent an example of a screenshot for the navigation system 100.

The first control unit 512 can operate the first user interface 518 to display information generated by the navigation system 100. The first control unit 512 can also execute the first software 526 for the other functions of the navigation system 100, including receiving location information from the first location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, a second user interface 538, and a second location unit 552.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as nonvolatile random access memory (NVRAM), Flash memory, disk storage, or a volatile storage such as static random access memory (SRAM).

The second storage unit 546 can include a second storage interface 548. The second storage interface 548 can be used for communication between the first location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

The second location unit 552 can receive location information, current heading, and current speed of the first device 102, as examples. The second location unit 552 can be implemented in many ways. For example, the second location unit 552 can function as at least a part of a global positioning system (GPS), an inertial navigation system, a cellular-tower location system, a pressure location system, or any combination thereof.

The second location unit 552 can include a second location interface 554. The second location interface 554 can be used for communication between the second location unit 552 and other functional units in the first device 102. The second location interface 554 can also be used for communication that is external to the second device 106.

The second location interface 554 can receive information from the other functional units or from external sources, or can transmit information to the other functional units or to external destinations. The external sources and the external destinations refer to sources and destinations external to the second device 106.

The second location interface 554 can include different implementations depending on which functional units or external units are being interfaced with the second location unit 552. The second location interface 554 can be implemented with technologies and techniques similar to the implementation of the second controller interface 544.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the first location unit 520, although it is understood that the second device 106 can also operate the first location unit 520.

Figures 6, 7:
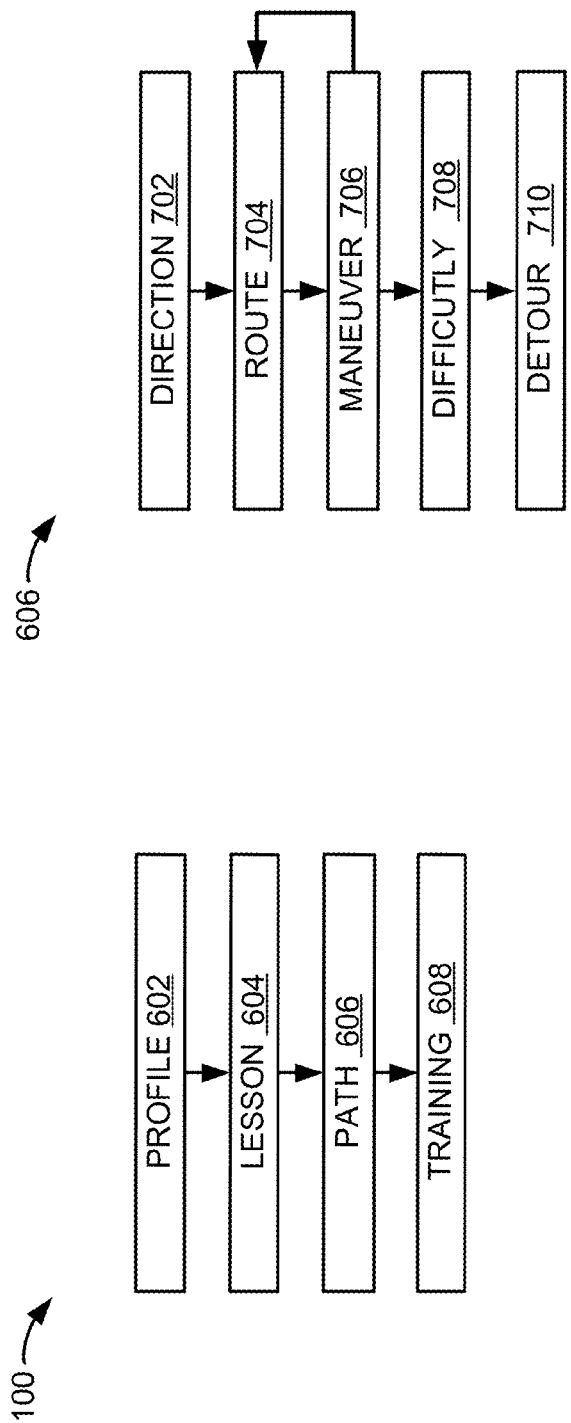
FIG. 6 is a control flow of the navigation system.
FIG. 7 is a detailed view of the path module.

Referring now to FIG. 6, therein is shown a control flow of the navigation system 100. The navigation system 100 can include a profile module 602, a lesson module 604, a path module 606, and a training module 608. In the navigation system 100, as an example, each module is indicated by a number and successively higher module numbers follow one another. Control flow can pass from one module to the next higher numbered module unless explicitly otherwise indicated.

The profile module 602 receives driver experience information about the driver of the driver's vehicle 204 of FIG. 2 for generating the maneuver instruction 212 of FIG. 2. For example, the navigation system 100 can classify a driver as "beginner", "intermediate", or "expert" based on the driver's performance in prior driving sessions. First time users of the navigation system 100 can take a driving tutorial and the navigation system 100 can determine the driver's experience based on the driver's performance of the tutorial.

For example, the navigation system 100 can generate the practice route 211 of FIG. 2 for a driver that is operating the navigation system 100 for the first time. The practice route 211 can be used as a tutorial to evaluate the driver's experience. The practice route 211 can include a series of the driving maneuver 206 of FIG. 2 including turns, merges, lane changes, and parking. The navigation system 100 can classify the experience of the driver based on the driver skill grade 224 of FIG. 2 of the maneuver attempt 222 of FIG. 2 that were performed on the practice route 211.

The driver can also skip the tutorial and input an experience level such as "beginner", "intermediate", and "expert" as examples. The navigation system 100 can use the experience of drivers to generate the maneuver instruction 212 with content that is designed for that experience level. For example, beginner drivers can receive the maneuver instruction 212 that is designed for beginners.

The profile module 602 can store lesson progress and training history of the driver including the driver skill grade 224 for the driving maneuver 206 of FIG. 2. The navigation system 100 can track the driver's progress as the driver improves. For example, the driver can complete "beginner" driving tutorials and move on to intermediate level driving lessons. At the intermediate level, the driver can receive the maneuver instruction 212 that is designed for intermediate drivers.

The lesson module 604 provides lessons for driver training and a driver training curriculum based on the experience level of the driver. The lesson module 604 also receives the lesson request 218 of FIG. 2. For example, the driver can input "beginner" into the profile module 602 and the lesson module 604 can provide training tutorials on driving fundamentals. The lesson request 218 can be requests for lessons and tutorials on turning, parking, and other types of the driving maneuver 206.

The path module 606 identifies the vehicle direction 404 of FIG. 4 and receives geographic information to identify the driving maneuver 206 in the travel route 210 of FIG. 2. The path module 606 also identifies the maneuver difficulty 308 of FIG. 3 of the driving maneuver 206.

The path module 606 also generates the practice route 211 of FIG. 2 and the detour 312 of FIG. 3. The path module 606 can access geographic information, traffic information, GPS information, or a combination thereof to identify the driving maneuver 206 in the travel route 210. The path module 606 will be explained in greater detail below.

The training module 608 generates and modifies the maneuver instruction 212. The training module 608 provides driver training by generating the maneuver instruction 212 for the driving maneuver 206. The training module 608 can also modify the maneuver instruction 212 during the maneuver attempt 222 to recommend corrections to the driver's deviations to the maneuver instruction 212. The training module 608 will be explained in greater detail below.

The physical transformation from monitoring the maneuver attempt 222 and modifying the maneuver instruction 212 based on the maneuver attempt 222 results in movement in the physical world, such as people using the first device 102, the vehicle, or a combination thereof, based on the operation of the navigation system 100. Drivers respond to the maneuver instruction 212 as they perform the maneuver attempt 222 of the driving maneuver 206.

The navigation system 100 monitors the maneuver attempt 222 and modifies the maneuver instruction 212 to give the driver feedback on the driver's performance. As the movement in the physical world occurs, the movement itself creates additional information that is converted back to the maneuver attempt 222 and the maneuver instruction 212 for continued operation of the navigation system 100 and to continue the movement in the physical world.

The navigation system 100 can be implemented on the first device 102 of FIG. 5, on the second device 106 of FIG. 5, or partitioned between the first device 102 and the second device 106. The first software 526 of FIG. 5 of the first device 102 can include the navigation system 100. For example, the first software 526 can include the profile module 602, the lesson module 604, the path module 606, and the training module 608. The first control unit 512 of FIG. 5 can execute the first software 526.

The first control unit 512 can execute the profile module 602, the lesson module 604, the path module 606, and the training module 608. The first control unit 512 can execute the profile module 602 to receive information about the driver. The first control unit 512 can execute the lesson module 604 to receive the lesson request 218.

The first control unit 512 can execute the path module 606 to identify the vehicle direction 404 and identify the driving maneuver 206 in the travel route 210. The first control unit 512 can execute the training module 608 to generate and modify the maneuver instruction 212.

The first communication unit 516 of FIG. 5 can be used by the path module 606 to receive GPS information and to send and receive navigation information. The first location unit 520 of FIG. 5 can be used by the path module 606 to identify the vehicle direction 404. The first display interface 530 of FIG. 5 can be used by the training module 608 to display navigation information.

In an example for the second device 106 of FIG. 5, the second software 542 of FIG. 5 can include the navigation system 100. For example, the second software 542 can include the profile module 602, the lesson module 604, the path module 606, and the training module 608. The second control unit 534 of FIG. 5 can execute the second software 542.

The second control unit 534 can execute the profile module 602, the lesson module 604, the path module 606, and the training module 608. The second control unit 534 can execute the profile module 602, the lesson module 604, the path module 606, and the training module 608. The second control unit 534 can execute the profile module 602 to receive information about the driver. The second control unit 534 can execute the lesson module 604 to receive the lesson request 218.

The second control unit 534 can execute the path module 606 to identify the vehicle direction 404 and identify the driving maneuver 206 in the travel route 210. The second control unit 534 can execute the training module 608 to generate and modify the maneuver instruction 212.

The second communication unit 536 of FIG. 5 can be used by the path module 606 to receive GPS information and to send and receive navigation information. The second location unit 552 of FIG. 5 can be used by the path module 606 to identify the vehicle direction 404. The second display interface 540 can be used by the training module 608 to display navigation information.

In another example, the navigation system 100 can be partitioned between the first software 526 and the second software 542. For example, the first software 526 can include the training module 608. The second software 542 can include the profile module 602, the lesson module 604, and the path module 606. The second control unit 534 can execute modules partitioned on the second software 542 and the first control unit 512 can execute modules partitioned on the first software 526.

The second control unit 534 can execute the profile module 602, the lesson module 604, and the path module 606. The second control unit 534 can execute the profile module 602 to receive information about the driver. The second control unit 534 can execute the lesson module 604 to receive the lesson request 218. The second control unit 534 can execute the path module 606 to identify the vehicle direction 404 and identify the driving maneuver 206 in the travel route 210.

The second communication unit 536 can be used by the path module 606 to receive GPS information and to send and receive navigation information. The second location unit 552 can be used by the path module 606 to identify the vehicle direction 404.

The first control unit 512 can execute the training module 608 to generate and modify the maneuver instruction 212. The first display interface 530 can be used by the training module 608 to display navigation information.

It has been discovered that the present invention provides the navigation system 100 with maneuver attempt training mechanism for teaching and training drivers on how to perform the driving maneuver 206. By monitoring the driver's performance and adapting the maneuver instruction 212 based on driver's improvement, the navigation system 100 can supplement or replace human driving instructors. The navigation system 100 can train drivers on how to complete basic and difficult maneuvers such as parallel parking and freeway merging.

It has been discovered that the present invention provides the navigation system 100 with maneuver attempt training mechanism for improving driving skills by generating the maneuver instruction 212 based on the experience of a driver. The navigation system 100 can generate different versions of the maneuver instruction 212 based on the experience of the driver. For example, the navigation system 100 can provide the maneuver instruction 212 that is designed for drivers with intermediate experience. The maneuver instruction 212 can include instructions on how to complete the driving maneuver 206 such as turns, parking, merging, yielding and reversing.

The navigation system 100 describes the module functions or order as an example. The modules can be partitioned differently. For example, the profile module 602, the lesson module 604, the path module 606, and the training module 608 can be implemented as one module or with lesser number of modules. Each of the modules can operate individually and independently of the other modules.

Referring now to FIG. 7, therein is shown a detailed view of the path module 606. The path module 606 identifies the vehicle direction 404 of FIG. 2, generates the travel route 210 of FIG. 2, and identifies the driving maneuver 206 of FIG. 2 in the travel route 210. The path module 606 can also identify the maneuver difficulty 308 of FIG. 3 of the driving maneuver 206 and generate the detour 312 of FIG. 3 to the travel route 210.

The path module 606 can include a direction module 702, a route module 704, a maneuver module 706, a difficulty module 708, and a detour module 710. In the navigation system 100, as an example, each module is indicated by a number and successively higher module numbers follow one another. Control flow can pass from one module to the next higher numbered module unless explicitly otherwise indicated.

The direction module 702 identifies the vehicle direction 404 of the driver's vehicle 204 of FIG. 2. The driver's vehicle 204 of FIG. 2 can be equipped with a compass, GPS, cellular triangulation, or a combination thereof to identify the vehicle direction 404. The vehicle direction 404 can be used to indicate the direction that the vehicle will travel.

For example, the vehicle direction 404 can be used to identify the vehicle's angle of entry for the driving maneuver 206 like parallel parking. For parallel parking, the maneuver instruction 212 of FIG. 2 can recommend the vehicle direction 404 of one hundred and forty degrees for reversing into the parking spot. The vehicle direction 404 of the vehicle can be one hundred degrees and the driver will fail to enter the parking spot if they begin the driving maneuver 206. The driver should adjust the vehicle direction 404 to one hundred and forty degrees to successfully complete the parking maneuver 402 of FIG. 4.

The route module 704 generates the travel route 210 for navigating to destinations. The route module 704 can identify the location of the driver's vehicle 204 and the location of the destination for generating the travel route 210 to the destination. The driver can receive the maneuver instruction 212 for driver training while navigating to the destination at the end of the travel route 210. The route module 704 can also generate the practice route 211 of FIG. 2 after receiving navigation information from the maneuver module 706.

The maneuver module 706 identifies the driving maneuver 206 in the travel route 210 for navigating to a destination. The maneuver module 706 can use navigation and traffic information about the travel route 210 to identify the driving maneuver 206. For example, geographic information on the travel route 210 can provide information about curves, turns, and straightaways on the travel route 210. The geographic information on the travel route 210 can also provide information about the dimensions and distances of curves, turns, and straightaways in the travel route 210.

The maneuver module 706 can also identify the driving maneuver 206 in a geographic region around the driver's vehicle 204 for generating the practice route 211 of FIG. 2. For example, the maneuver module 706 can identify a U-turn near the driver's vehicle 204 by using navigation and geographic information based on the location of the driver's vehicle 204. The maneuver module 706 can send the location of the U-turn to the route module 704 for generating the practice route 211.

The difficulty module 708 assigns the maneuver difficulty 308 to the driving maneuver 206. For example, the maneuver difficulty 308 for the driving maneuver 206 of parallel parking can be assigned as "hard" base on other driver's experience with parallel parking.

The difficulty module 708 can assign the maneuver difficulty 308 to the driving maneuver 206 for a specific location. For example, the difficulty module 708 can assign "hard" to the unprotected left turn 304 of FIG. 3 at "Main Street". The maneuver difficulty 308 can be based on user generated content or historical information about the driving maneuver 206 like accident reports.

The detour module 710 determines if the maneuver difficulty 308 of the driving maneuver 206 exceeds the driver's experience or the driver skill grade 224 of FIG. 2 for the driving maneuver 206. The detour module 710 can receives the driver's experience from the profile module 602. For example, the driver can select "beginner" in the profile module 602.

If the maneuver difficulty 308 of the driving maneuver 206 exceeds the driver's experience, the detour module 710 can assign the driving maneuver 206 as the dangerous situation 310 of FIG. 3. The driving maneuver 206 can also be assigned as the dangerous situation 310 if the driver skill grade 224 for the driving maneuver 206 is "D" or "F" and the maneuver difficulty 308 is "hard". The detour module 710 can generate the detour 312 to the travel route 210 with the driving maneuver 206 that does not exceed the driver's abilities.

For example, the driving maneuver 206 of the unprotected left turn 304 of FIG. 3 can be classified as "high" and the driver can be a novice. Based on the driver's experience, the detour module 710 can determine that the unprotected left turn 304 is the dangerous situation 310 for the driver. The detour module 710 can generate the detour 312 to the travel route 210 to avoid the dangerous situation 310. The detour 312 can be a route using the three-way stop 306 of FIG. 3 to avoid the dangerous situation 310.

The physical transformation from identifying the maneuver difficulty 308 of the driving maneuver 206 and generating the detour 312 to avoid the dangerous situation 310 to redirect the driver results in movement in the physical world, such as people using the first device 102, the vehicle, or a combination thereof, based on the operation of the navigation system 100. As the movement in the physical world occurs, the movement itself creates additional information that is converted back to the maneuver difficulty 308, the detour 312, and the travel route 210 for the continued operation of the navigation system 100 and to continue the movement in the physical world.

The navigation system 100 can be implemented on the first device 102 of FIG. 5, on the second device 106 of FIG. 5, or partitioned between the first device 102 and the second device 106. The first software 526 of FIG. 5 of the first device 102 can include the navigation system 100. For example, the first software 526 can include the direction module 702, the route module 704, the maneuver module 706, the difficulty module 708, and the detour module 710. The first control unit 512 of FIG. 5 can execute the first software 526.

The first control unit 512 can execute the direction module 702, the route module 704, the maneuver module 706, the difficulty module 708, and the detour module 710. The first control unit 512 can execute the direction module 702 to identify the vehicle direction 404. The first control unit 512 can execute the route module 704 to generate the travel route 210 and the practice route 211.

The first control unit 512 can execute the maneuver module 706 to identify the driving maneuver 206. The first control unit 512 can execute the difficulty module 708 to assign the maneuver difficulty 308 to the driving maneuver 206. The first control unit 512 can execute the detour module 710 to generate the detour 312 to the travel route 210.

The first communication unit 516 of FIG. 5 can be used by the direction module 702, the route module 704, the maneuver module 706, and the detour module 710 to receive GPS information and to send and receive navigation information. The first location unit 520 can be used by the direction module 702 to identify the vehicle direction 404. The first display interface 530 can be used by the route module 704 and the detour module 710 to display navigation information.

In an example for the second device 106 of FIG. 5, the second software 542 of FIG. 5 can include the navigation system 100. For example, the second software 542 can include the direction module 702, the route module 704, the maneuver module 706, the difficulty module 708, and the detour module 710. The second control unit 534 of FIG. 5 can execute the second software 542.

The second control unit 534 can execute the direction module 702, the route module 704, the maneuver module 706, the difficulty module 708, and the detour module 710. The second control unit 534 can execute the direction module 702 to identify the vehicle direction 404. The second control unit 534 can execute the route module 704 to generate the travel route 210 and the practice route 211.

The second control unit 534 can execute the maneuver module 706 to identify the driving maneuver 206. The second control unit 534 can execute the difficulty module 708 to assign the maneuver difficulty 308 to the driving maneuver 206. The second control unit 534 can execute the detour module 710 to generate the detour 312 to the travel route 210.

The second communication unit 536 of FIG. 5 can be used by the direction module 702, the route module 704, the maneuver module 706, and the detour module 710 to receive GPS information and to send and receive navigation information. The second location unit 552 of FIG. 5 can be used by the direction module 702 to identify the vehicle direction 404. The second display interface 540 of FIG. 5 can be used by the route module 704 and the detour module 710 to display navigation information.

In another example, the navigation system 100 can be partitioned between the first software 526 and the second software 542. For example, the first software 526 can include the maneuver module 706. The second software 542 can include the direction module 702, the route module 704, the difficulty module 708, and the detour module 710. The second control unit 534 can execute modules partitioned on the second software 542 and the first control unit 512 can execute modules partitioned on the first software 526.

The second control unit 534 can execute the direction module 702, the route module 704, the difficulty module 708, and the detour module 710. The second control unit 534 can execute the direction module 702 to identify the vehicle direction 404. The second control unit 534 can execute the route module 704 to generate the travel route 210 and the practice route 211.

The second control unit 534 can execute the difficulty module 708 to assign the maneuver difficulty 308 to the driving maneuver 206. The second control unit 534 can execute the detour module 710 to generate the detour 312 to the travel route 210.

The second communication unit 536 of FIG. 5 can be used by the direction module 702, the route module 704, and the detour module 710 to receive GPS information and to send and receive navigation information. The second location unit 552 of FIG. 5 can be used by the direction module 702 to identify the vehicle direction 404. The second display interface 540 of FIG. 5 can be used by the route module 704 and the detour module 710 to display navigation information.

The first control unit 512 can execute the maneuver module 706 to identify the driving maneuver 206. The first communication unit 516 of FIG. 5 can be used the maneuver module 706 to receive GPS information and to send and receive navigation information.

It has been discovered that the present invention provides the navigation system 100 with maneuver attempt mechanism for generating the detour 312 for making roads and traffic conditions safer by routing inexperienced drivers around the dangerous situation 310. As the driver uses the navigation system 100 to learn how to drive, the navigation system 100 can reroute drivers to roads that match the driver's experience and skill, which improves road safety for all motorist.

It has also been discovered that the navigation system 100 can detect the dangerous situation 310 of the driving maneuver 206 with the maneuver difficulty 308 that exceeds the driver skill grade 224 for the driving maneuver 206. The navigation system 100 can generate the detour 312 to avoid the dangerous situation 310. The navigation system 100 can identify the driving maneuver 206 in the travel route 210 and assign the maneuver difficulty 308 to the driving maneuver 206. The detour 312 of the dangerous situation 310 allows inexperienced drivers a safer alternative when navigation to destinations and decreases accidents. Drivers can practice driving on safer routes based on their skill and experience.

The navigation system 100 describes the module functions or order as an example. The modules can be partitioned differently. For example, the direction module 702, the route module 704, the maneuver module 706, the difficulty module 708, and the detour module 710 can be implemented as one module or with lesser number of modules. Each of the modules can operate individually and independently of the other modules.

Figures 8, 9:
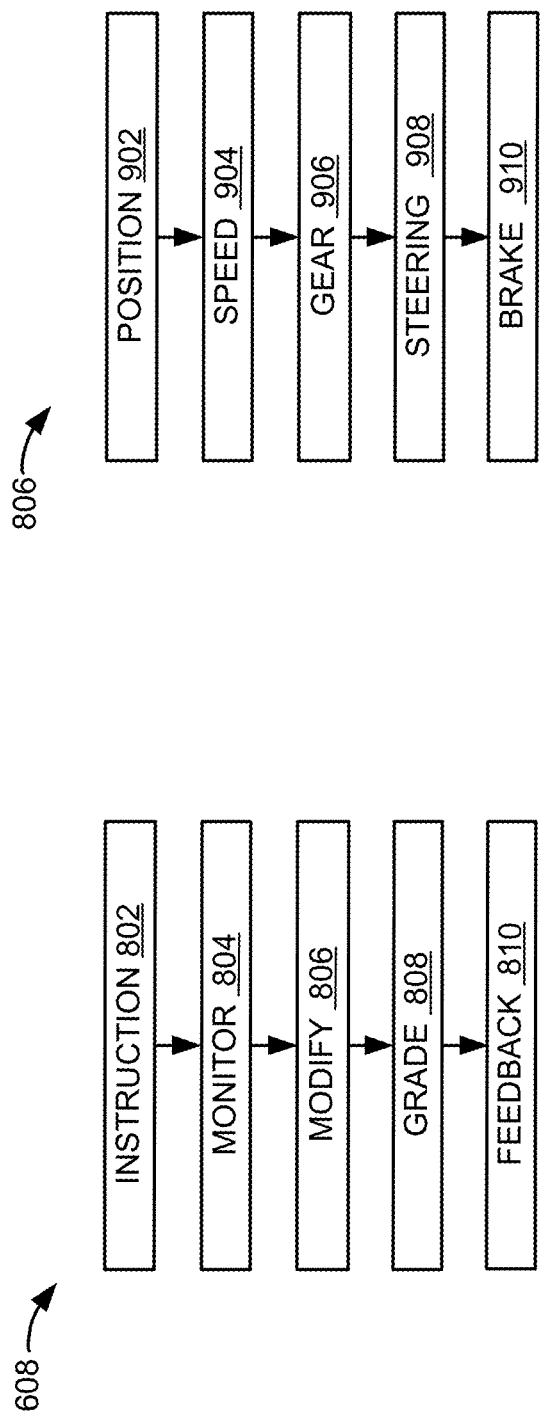
FIG. 8 is a detailed view of the training module.
FIG. 9 is a detailed view of the modify module.

Referring now to FIG. 8, therein is shown a detailed view of the training module 608. The training module 608 generates and modifies the maneuver instruction 212 of FIG. 2 for the driver to attempt the driving maneuver 206 of FIG. 2. The training module 608 can include an instruction module 802, a monitor module 804, a modify module 806, a grade module 808, and a feedback module 810.

The modules within the training module 608, as an example, can be indicated by a number and successively higher module numbers follow one another. Control flow can pass from one module to the next higher numbered module unless explicitly otherwise indicated.

The instruction module 802 generates the maneuver instruction 212 for the driving maneuver 206. The instruction module 802 can generate the basic instruction 214 of FIG. 2 or the location-specific instruction 216 of FIG. 2. For example, the driver can receive the basic instruction 214 for a left turn by selecting a left turn as the lesson request 218 of FIG. 2 from the lesson module 604 of FIG. 6. The instruction module 802 can generate the basic instruction 214 for the left turn.

The instruction module 802 can also generate the location-specific instruction 216 for the driving maneuver 206. For example, the instruction module 802 can generate the location-specific instruction 216 for the unprotected left turn 304 of FIG. 3. The instruction module 802 can use geographic information from the travel route 210 to generate specific instruction for the driving maneuver 206.

For example, the instruction module 802 can identify the length of the intersection from geographic information from the travel route 210. The instruction module 802 can use the length of the intersection to determine when a vehicle should turn during the driving maneuver 206. Further, for example, the instruction module 802 can also generate the location-specific instruction 216 of a hairpin turn based on the geographic dimensions of the turn.

The instruction module 802 can generate the maneuver instruction 212 for different time periods during the driving maneuver 206. For example, the maneuver instruction 212 can be generated for the approaching stage 316, the entering stage 318, the middle stage 320, and the end stage 322 of FIG. 3 of the driving maneuver 206.

The monitor module 804 monitors the maneuver attempt 222 of FIG. 2 for the compliance 226 of FIG. 2 to the maneuver instruction 212. The monitor module 804 can identify the driver's deviations to the maneuver instruction 212 in the maneuver attempt 222. For example, when the driver is attempting the driving maneuver 206, the monitor module 804 can monitor the vehicle direction 404 of FIG. 4, the vehicle speed during the maneuver, the gear shifts during the maneuver, the steering, and the braking during the maneuver.

Further, for example, the instruction module 802 can generate the maneuver instruction 212 to begin the parking maneuver 402 of parallel parking at five miles per hour. The monitor module 804 can monitor that the maneuver attempt 222 was at fifteen miles per hour for the parallel parking attempt. The monitor module 804 can also monitor the vehicle direction 404 and the vehicle's angle of entry during parallel parking.

The monitor module 804 can use sensors in the vehicle, accelerometers, video cameras, or a combination thereof to monitor the maneuver attempt 222. For example, accelerometers can detect the vehicle speed during the maneuver attempt 222 and identify swerving and direction changes during turns. GPS can be used to identify the vehicle direction 404 and the vehicle's directional orientation. Sensors attached to the driver's vehicle 204 can monitor steering and braking during the maneuver attempt 222.

The modify module 806 modifies the maneuver instruction 212 based on the maneuver attempt 222 of the driving maneuver 206. The modify module 806 identifies how the maneuver attempt 222 is deviating from the maneuver instruction 212 and modifies the maneuver instruction 212 to adjust for the deviations. The modify module 806 will be explained in greater detail below.

The grade module 808 assigns the driver skill grade 224 of FIG. 2 to the maneuver attempt 222 based on the driver's conformity to the maneuver instruction 212. The grade module 808 assigns the driver skill grade 224 based on the compliance 226 to the maneuver instruction 212.

For example, if the maneuver attempt 222 is ten miles per hour faster than the recommendation from the maneuver instruction 212, the grade module 808 can assign "B" for the driver skill grade 224 of the driving maneuver 206. If the maneuver attempt 222 is thirty miles above the recommendation from the maneuver instruction 212, the grade module 808 can assign a "D" for the driver skill grade 224. The driver skill grade 224 can be used in subsequent driving trips to determine the dangerous situation 310 of FIG. 3.

The feedback module 810 generates the training feedback 314 of FIG. 3 for the driver to improve to the driver skill grade 224 for the driving maneuver 206 in subsequent driving sessions. For example, the grade module 808 can identify that the driver is attempting a left turn too quickly and drifting out of the vehicle's turn lane at the end of the maneuver attempt 222. The grade module 808 can assign the driver skill grade of "D" to the maneuver attempt 222 based on the driver's performance.

The feedback module 810 can generate instruction or suggestions on how the driver can improve the driver skill grade 224. The driver can read and study the training feedback 314 to improve the driver skill grade 224 for the next time that the driver attempts the driving maneuver 206. For example, the training feedback 314 can include instructions for the driver to reduce the vehicle's speed and remain in the turning lane for all left turns. The driver can study the training feedback 314 and follow the instructions in subsequent attempts at left turns to improve the driver skill grade 224 for the driving maneuver 206 of turning left.

The physical transformation from generating the location-specific instruction 216 and assigning the driver skill grade 224 results in movement in the physical world, such as people using the first device 102, the vehicle, or a combination thereof, based on the operation of the navigation system 100. As the movement in the physical world occurs, the movement itself creates additional information that is converted back to the location-specific instruction 216 and the driver skill grade 224 for the continued operation of the navigation system 100 and to continue the movement in the physical world.

The navigation system 100 can be implemented on the first device 102 of FIG. 5, on the second device 106 of FIG. 5, or partitioned between the first device 102 and the second device 106. The first software 526 of FIG. 5 of the first device 102 can include the navigation system 100. For example, the first software 526 can include the instruction module 802, the monitor module 804, the modify module 806, the grade module 808, and the feedback module 810. The first control unit 512 of FIG. 5 can execute the first software 526.

The first control unit 512 can execute the instruction module 802, the monitor module 804, the modify module 806, the grade module 808, and the feedback module 810. The first control unit 512 can execute the instruction module 802 to generate the basic instruction 214 and the location-specific instruction 216. The first control unit 512 can execute the monitor module 804 to monitor the maneuver attempt 222.

The first control unit 512 can execute the modify module 806 to modify the maneuver instruction 212. The first control unit 512 can execute the grade module 808 to assign the driver skill grade 224 to the maneuver attempt 222 based on the compliance 226 to the maneuver instruction 212. The first control unit 512 can execute the feedback module 810 to generate the training feedback 314.

The first communication unit 516 of FIG. 5 can be used by the instruction module 802 and the monitor module 804 to receive GPS information and to send and receive navigation information. The first location unit 520 can be used by the monitor module 804 to identify monitor the vehicle direction 404 during the maneuver attempt 222. The first display interface 530 can be used by the instruction module 802 to display the maneuver instruction 212.

In an example for the second device 106 of FIG. 5, the second software 542 of FIG. 5 can include the navigation system 100. For example, the second software 542 can include the instruction module 802, the monitor module 804, the modify module 806, the grade module 808, and the feedback module 810. The second control unit 534 of FIG. 5 can execute the second software 542.

The second control unit 534 can execute the instruction module 802, the monitor module 804, the modify module 806, the grade module 808, and the feedback module 810. The second control unit 534 can execute the instruction module 802 to generate the basic instruction 214 and the location-specific instruction 216. The second control unit 534 can execute the monitor module 804 to monitor the maneuver attempt 222.

The second control unit 534 can execute the modify module 806 to modify the maneuver instruction 212. The second control unit 534 can execute the grade module 808 to assign the driver skill grade 224 to the maneuver attempt 222 based on the compliance 226 to the maneuver instruction 212. The second control unit 534 can execute the feedback module 810 to generate the training feedback 314.

The second communication unit 536 of FIG. 5 can be used by the instruction module 802 and the monitor module 804 to receive GPS information and to send and receive navigation information. The second location unit 552 of FIG. 5 can be used by the monitor module 804 to identify monitor the vehicle direction 404 during the maneuver attempt 222. The second display interface 540 of FIG. 5 can be used by the instruction module 802 to display the maneuver instruction 212.

In another example, the navigation system 100 can be partitioned between the first software 526 and the second software 542. For example, the first software 526 can include the feedback module 810. The second software 542 can include the instruction module 802, the monitor module 804, the modify module 806, and the grade module 808. The second control unit 534 can execute modules partitioned on the second software 542 and the first control unit 512 can execute modules partitioned on the first software 526.

The second control unit 534 can execute the instruction module 802, the monitor module 804, the modify module 806, and the grade module 808. The second control unit 534 can execute the instruction module 802 to generate the basic instruction 214 and the location-specific instruction 216. The second control unit 534 can execute the monitor module 804 to monitor the maneuver attempt 222.

The second control unit 534 can execute the modify module 806 to modify the maneuver instruction 212. The second control unit 534 can execute the grade module 808 to assign the driver skill grade 224 to the maneuver attempt 222 based on the compliance 226 to the maneuver instruction 212.

The second communication unit 536 of FIG. 5 can be used by the instruction module 802 and the monitor module 804 to receive GPS information and to send and receive navigation information. The second location unit 552 of FIG. 5 can be used by the monitor module 804 to identify monitor the vehicle direction 404 during the maneuver attempt 222.

The second display interface 540 of FIG. 5 can be used by the instruction module 802 to display the maneuver instruction 212. The first control unit 512 can execute the feedback module 810 to generate the training feedback 314.

It has been discovered that the present invention provides the navigation system 100 with maneuver attempt mechanism for training and instructing drivers using the basic instruction 214 and the location-specific instruction 216. Drivers can use the basic instruction 214 to learn and practice the driving maneuver 206 such as the turn maneuver 208 of FIG. 2 and the parking maneuver 402 of FIG. 4. Drivers can use the location-specific instruction 216 to learn and practice specific examples of the driving maneuver 206 like the unprotected left turn 304 of FIG. 3.

The navigation system 100 provides feedback and modifies the maneuver instruction 212 based on the driver's performance of the driving maneuver 206. For example, the navigation system 100 monitors the maneuver attempt 222 and modifies the maneuver instruction 212 based on the maneuver attempt 222 for giving the driver personalized instruction on how to correct their deviations from the maneuver instruction 212.

The navigation system 100 can monitor the maneuver attempt 222 of the driving maneuver 206 and identify the conformity or deviations between the maneuver attempt 222 and the guidelines of the maneuver instruction 212. The navigation system 100 can modify the maneuver instruction 212 so the driver can correct their actions as they attempt to complete the driving maneuver 206.

It has also been discovered that the navigation system 100 can improve a driver's performance by assigning the driver skill grade 224 to the maneuver attempt 222. The navigation system 100 can identify the discrepancies between the driver's performance of the maneuver attempt 222 and the maneuver instruction 212. The navigation system 100 can assign the driver skill grade 224 to the maneuver attempt 222 based on how closely the driver conformed to the maneuver instruction 212. The navigation system 100 can also generate the training feedback 314 to give the driver instructions on how to improve the driver skill grade 224 for the driving maneuver 206.

The navigation system 100 describes the module functions or order as an example. The modules can be partitioned differently. For example, the instruction module 802, the monitor module 804, the modify module 806, the grade module 808, and the feedback module 810 can be implemented as one module or with lesser number of modules. Each of the modules can operate individually and independently of the other modules.

Referring now to FIG. 9, therein is shown a detailed view of the modify module 806. The modify module 806 modifies the maneuver instruction 212 of FIG. 2 based on the maneuver attempt 222 of FIG. 2 of the driving maneuver 206 of FIG. 2. The modify module 806 modifies, adapts, or changes the maneuver instruction 212 based on the driver's performance.

For example, the modify module 806 can provide the driver was instructions for correcting the maneuver attempt 222 of the driving maneuver 206. The maneuver instruction 212 can be to "drive twenty miles per hour into the turn", and the driver can be approaching the turn at fifty miles per hour. The maneuver instruction 212 for the next stage of the driving maneuver 206 can be modified to instruct the driver to "slow down to thirty miles per hour by gently tapping on the brake to avoid an accident during the turn". The modifications to the maneuver instruction 212 are based on the maneuver attempt 222.

The modify module 806 can modify the maneuver instruction 212 at the approaching stage 316, the entering stage 318, the middle stage 320, and the end stage 322 of FIG. 3. For example, the driver can receive the maneuver instruction 212 at the approaching stage 316 that includes the steps for completing a turn. At the approaching stage 316, the driver can be deviating from the guidelines of the maneuver instruction 212 such as traveling too fast. The modify module 806 can modify the maneuver instruction 212 based on the speed deviation and modify the maneuver instruction 212 to instruct the driver to slow down at after the approaching stage 316, at the entering stage 318, at the middle stage 320, and at the end stage 322.

Further, for example, the driver can request the maneuver instruction 212 for the parking maneuver 402 of FIG. 2 of parallel parking. The navigation system 100 can generate the location-specific instruction 216 of FIG. 2 for parking at the parking spot near the driver's vehicle 204. The maneuver instruction 212 can instruct the driver to turn the steering wheel so that the vehicle direction 404 of FIG. 4 is one hundred and forty degrees as the vehicle reverses.

The driver can turn the steering wheel to one hundred degrees and attempt the driving maneuver 206. The navigation system 100 can detect the deviation from the maneuver instruction 212. The modify module 806 can modify the maneuver instruction 212 to instruct the driver to continue to turn the steering wheel an additional forty degrees. If the driver cannot complete the parallel parking maneuver, the modify module 806 can modify the maneuver instruction 212 to instruct the driver to restart the driving maneuver 206.

The modify module 806 can include a position module 902, a speed module 904, a gear module 906, a steering module 908, and a brake module 910. The position module 902, the speed module 904, the gear module 906, the steering module 908, and the brake module 910 use deviations of the maneuver attempt 222 from the maneuver instruction 212 for modifying the maneuver instruction 212 to correct the driver's speed, positioning, gear shifts, steering direction, and braking.

The modules within the training module 608, as an example, can be indicated by a number and successively higher module numbers follow one another. Control flow can pass from one module to the next higher numbered module unless explicitly otherwise indicated.

The position module 902 generates the position recommendation 406 of FIG. 4 for modifying the maneuver instruction 212. The position recommendation 406 can be generated by identifying the deviation between the maneuver attempt 222 and the maneuver instruction 212 in terms of vehicle position. The position module 902 can use the deviation for generating the position recommendation 406 to provide instructions to correct the deviation.

For example, the driver's vehicle 204 can be entering a turn at the approaching stage 316 but the vehicle can be positioned five feet away from the recommended position from the maneuver instruction 212. The position module 902 can modify the maneuver instruction 212 by generating the position recommendation 406 that instructs the driver to "move the vehicle's position to two feet to the left". The position module 902 can also modify the maneuver instruction 212 by generating the position recommendation 406 for correcting the positioning of the vehicle in the entering stage 318 of the turn.

The speed module 904 generates the speed recommendation 408 of FIG. 4 for modifying the maneuver instruction 212. The speed recommendation 408 can be generated by identifying the deviation between the maneuver attempt 222 and the maneuver instruction 212 in terms of speed. The speed module 904 can use the deviation for generating the speed recommendation 408 to provide instructions to correct the deviation.

For example, the maneuver attempt 222 can be twenty miles per hour above the recommendation of the maneuver instruction 212. The speed module 904 can generate the speed recommendation 408 to instruct the driver to decrease the speed of the vehicle by twenty miles per hour as the vehicle approaches the next stage of the driving maneuver 206. The speed recommendation 408 can be based on the driver's deviation of twenty miles per hour above the recommendation of the maneuver instruction 212.

The gear module 906 generates the gear shift recommendation 410 of FIG. 4 for modifying the maneuver instruction 212. The gear shift recommendation 410 can be generated by identifying the deviation between the maneuver attempt 222 and the maneuver instruction 212 in terms of gear shifts. The gear module 906 can use the deviation for generating the gear shift recommendation 410 to provide instructions to correct the deviation.

For example, a driver with a vehicle with manual transmission can be shifting gears at times that are not recommended by the maneuver instruction 212. The gear module 906 can identify the deviations of the maneuver attempt 222 from the guidelines of the maneuver instruction 212.

The gear module 906 can modify the maneuver instruction 212 by generating the gear shift recommendation 410 based on the driver's performance of the driving maneuver 206. If the driver fails to conform to the maneuver instruction 212 of when to shift gears, the gear shift recommendation 410 can instruct the driver to shift gears based on the revolutions per minutes of the vehicle's engine and the vehicle's position during a turn.

The steering module 908 generates the steering recommendation 412 of FIG. 4 for modifying the maneuver instruction 212. The steering recommendation 412 can be generated by identifying the deviation between the maneuver attempt 222 and the maneuver instruction 212 in terms of steering the vehicle. The steering module 908 can use the deviation for generating the steering recommendation 412 to provide instructions to correct the deviation.

For example, the driver can be turning or attempting to parallel park. While attempting the driving maneuver 206, the driver can be turning the steering wheel too far to the left or too far to the right. The steering recommendation 412 can generate the steering recommendation 412 for the driver to correct the position of the steering wheel for the driving maneuver 206.

Further, for example, the steering recommendation 412 can be generated to correct over-steer and under-steering during the driving maneuver 206 such as turns. The steering module 908 can also recommend which direction to turn the steering wheel when the vehicle is traveling in reversing or attempting to park backwards.

The brake module 910 generates the braking recommendation 414 of FIG. 4 for modifying the maneuver instruction 212. The braking recommendation 414 can be generated by identifying the deviation between the maneuver attempt 222 and the maneuver instruction 212 in terms of braking the vehicle. The brake module 910 can use the deviation for generating the braking recommendation 414 to provide instructions to correct the deviation.

For example, a driver's braking of a vehicle can be deviating from the maneuver instruction 212 for the driving maneuver 206 at the entering stage 318 of the driving maneuver 206. The driving maneuver 206 can be a turn and the driver can be braking too softly. The brake module 910 can modify the maneuver instruction 212 by generating the braking recommendation 414 to instruct the driver to immediately brake harder and to gently tap the brake based on the driver's performance.

The physical transformation of the speed recommendation 408, the gear shift recommendation 410, the steering recommendation 412, and the braking recommendation 414 results in movement in the physical world, such as people using the first device 102 or vehicles, based on the operation of the navigation system 100. As the movement in the physical world occurs, the movement itself creates additional information that is converted back to the speed recommendation 408, the gear shift recommendation 410, the steering recommendation 412, and the braking recommendation 414 for continued operation of the navigation system 100 and to continue the movement in the physical world.

The navigation system 100 can be implemented on the first device 102 of FIG. 5, on the second device 106 of FIG. 5, or partitioned between the first device 102 and the second device 106. The first software 526 of FIG. 5 of the first device 102 can include the navigation system 100. For example, the first software 526 can include the speed module 904, the gear module 906, the position module 902, the steering module 908, and the brake module 910. The first control unit 512 of FIG. 5 can execute the first software 526.

The first control unit 512 can execute the speed module 904, the gear module 906, the position module 902, the steering module 908, and the brake module 910. The first control unit 512 can execute the speed module 904 to generate the speed recommendation 408. The first control unit 512 can execute the gear module 906 to generate the gear shift recommendation 410.

The first control unit 512 can execute the position module 902 to generate the position recommendation 406. The first control unit 512 can execute the steering module 908 to generate the steering recommendation 412. The first control unit 512 can execute the brake module 910 to generate the braking recommendation 414. The first location unit 520 can be used by the position module 902 to generate the position recommendation 406 by identifying the vehicle direction 404.

In an example for the second device 106 of FIG. 5, the second software 542 of FIG. 5 can include the navigation system 100. For example, the second software 542 can include the profile module 602, the lesson module 604, the path module 606, and the training module 608. The second control unit 534 of FIG. 5 can execute the second software 542.

The second control unit 534 can execute the speed module 904, the gear module 906, the position module 902, the steering module 908, and the brake module 910. The second control unit 534 can execute the speed module 904 to generate the speed recommendation 408. The second control unit 534 can execute the gear module 906 to generate the gear shift recommendation 410.

The second control unit 534 can execute the position module 902 to generate the position recommendation 406. The second control unit 534 can execute the steering module 908 to generate the steering recommendation 412. The second control unit 534 can execute the brake module 910 to generate the braking recommendation 414. The second location unit 552 can be used by the position module 902 to generate the position recommendation 406 by identifying the vehicle direction 404.

In another example, the navigation system 100 can be partitioned between the first software 526 and the second software 542. For example, the first software 526 can include the gear module 906. The second software 542 can include the speed module 904, the position module 902, the steering module 908, and the brake module 910. The second control unit 534 can execute modules partitioned on the second software 542 and the first control unit 512 can execute modules partitioned on the first software 526.

The second control unit 534 can execute the speed module 904, the position module 902, the steering module 908, and the brake module 910. The second control unit 534 can execute the speed module 904 to generate the speed recommendation 408. The second control unit 534 can execute the position module 902 to generate the position recommendation 406.

The second control unit 534 can execute the steering module 908 to generate the steering recommendation 412. The second control unit 534 can execute the brake module 910 to generate the braking recommendation 414. The second location unit 552 can be used by the position module 902 to generate the position recommendation 406 by identifying the vehicle direction 404. The first control unit 512 can execute the gear module 906 to generate the gear shift recommendation 410.

The navigation system 100 describes the module functions or order as an example. The modules can be partitioned differently. For example, the position module 902, the speed module 904, the gear module 906, the steering module 908, and the brake module 910 can be implemented as one module or with lesser number of modules. Each of the modules can operate individually and independently of the other modules.

It has been discovered that the present invention provides the navigation system 100 for providing drivers with driver training with instructions that are customized to the driver's performance of the driving maneuver 206. The navigation system 100 can modifying the maneuver instruction 212 based on the deviations in the maneuver attempt 222 from the maneuver instruction 212. The navigation system 100 can identify driving mistakes and provide instructions for a driver to improve the maneuver attempt 222 of the driving maneuver 206.

The navigation system 100 can modify the maneuver instruction 212 at the approaching stage 316, the entering stage 318, the middle stage 320, and the end stage 322 of the driving maneuver 206. If the driver deviations from the maneuver instruction 212 at the approaching stage 316, the maneuver instruction 212 for the entering stage 318 can be modified with instructions to correct the deviation.

The navigation system 100 can generating the position recommendation 406, the speed recommendation 408, the gear shift recommendation 410, the steering recommendation 412, or the braking recommendation 414 for modifying the maneuver instruction 212. The navigation system 100 can generate instructions on how to improve the driver's speed, road position, gear shifts, braking technique, and steering when the driver practices the driving maneuver 206.

Thus, it has been discovered that the navigation system 100 of the present invention furnishes important and heretofore unknown and unavailable solutions, capabilities, and functional aspects for a navigation system for monitoring people and objects.

Figure 10:
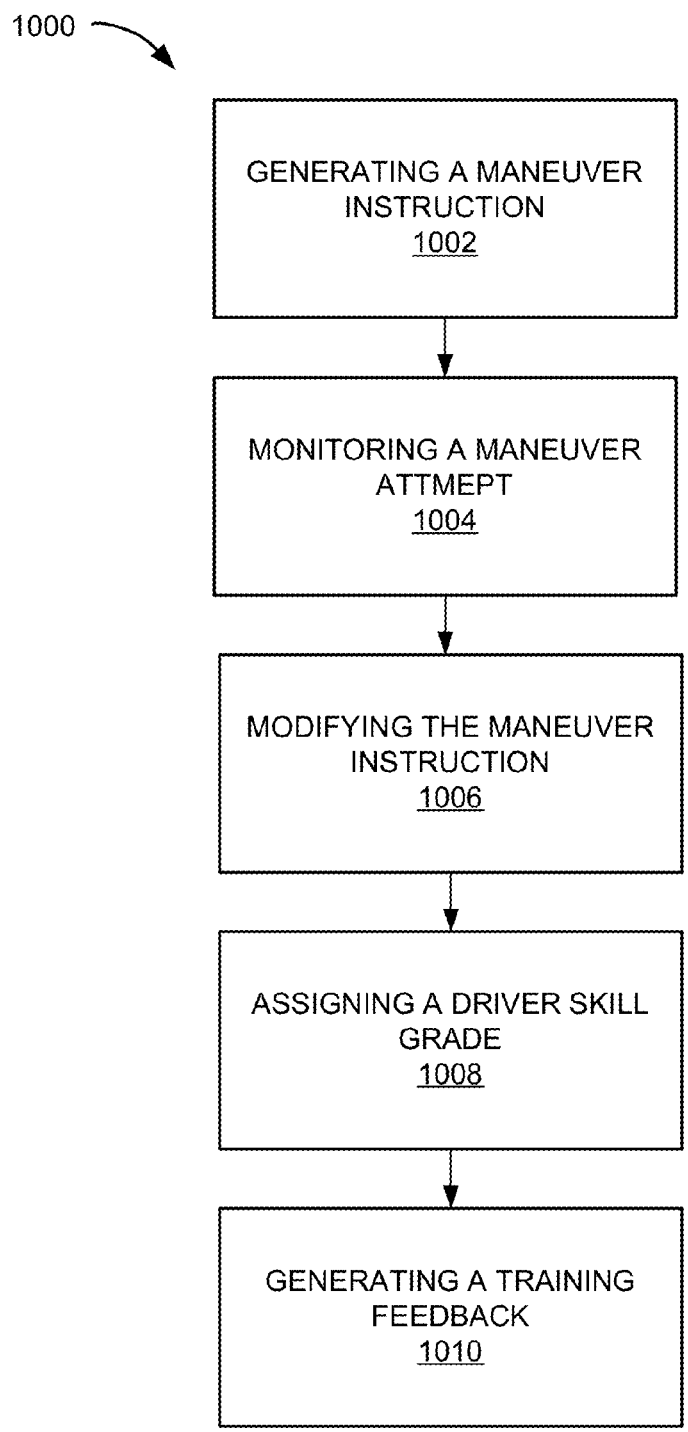
FIG. 10 is a flow chart of a method of operation of the navigation system in a further embodiment of the present invention.

Referring now to FIG. 10, therein is shown a flow chart of a method 1000 of operation of the navigation system in a further embodiment of the present invention. The method 1000 includes: generating a maneuver instruction for a driving maneuver, the maneuver instruction including an explanation of how to turn, merge, park or operate a driver's vehicle in a block 1002; monitoring a maneuver attempt for a compliance to the maneuver instruction in a block 1004; modifying the maneuver instruction based on the maneuver attempt in a block 1006; assigning a driver skill grade for the maneuver attempt based on the compliance to the maneuver instruction in a block 1008; and generating a training feedback to improve the driver skill grade of the maneuver attempt for displaying on a device in a block 1010.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   generating a maneuver instruction for a driving maneuver, the maneuver instruction including an explanation of how to turn, merge, or park a driver's vehicle;
   monitoring a maneuver attempt for a compliance to the maneuver instruction;
   modifying the maneuver instruction based on deviations of the maneuver attempt from the maneuver instruction;
   assigning a driver skill grade for the maneuver attempt based on the compliance to the maneuver instruction; and
   generating a training feedback to improve the driver skill grade of the maneuver attempt for displaying on a device.

2. The method as claimed in claim 1 further comprising:
   generating a travel route;
   identifying a maneuver difficulty of the driving maneuver in the travel route as exceeding the driver skill grade; and
   generating a detour to the travel route having a driving maneuver conformant to the driver skill grade.

3. The method as claimed in claim 1 further comprising:
   receiving a lesson request for the driving maneuver; and
   generating a travel route to the driving maneuver closest to the driver's vehicle.

4. The method as claimed in claim 1 wherein modifying the maneuver instruction based on the maneuver attempt includes modifying the maneuver instruction at an approaching stage, an entering stage, a middle stage, and an end stage of the driving maneuver.

5. The method as claimed in claim 1 wherein modifying the maneuver instruction based on the maneuver attempt includes:
   generating a speed recommendation;
   generating a gear shift recommendation;
   generating a position recommendation;
   generating a steering recommendation; or
   generating a braking recommendation.

6. A method of operation of a navigation system comprising:
   scanning a travel route for a driving maneuver;
   generating a maneuver instruction for the driving maneuver, the maneuver instruction including an explanation of how to turn, merge, or park a driver's vehicle;
   monitoring a maneuver attempt for a compliance to the maneuver instruction;
   modifying the maneuver instruction based on deviations of the maneuver attempt from the maneuver instruction;
   assigning a driver skill grade for the maneuver attempt based on the compliance to the maneuver instruction; and
   generating a training feedback to improve the driver skill grade of the maneuver attempt for displaying on a device.

7. The method as claimed in claim 6 wherein generating the maneuver instruction includes generating a location-specific instruction for the driving maneuver.

8. The method as claimed in claim 6 further comprising:
   identifying a parking maneuver as the driving maneuver; and
   wherein modifying the maneuver instruction includes:
   generating a position recommendation;
   generating a gear shift recommendation;
   generating a steering recommendation;
   generating a speed recommendation; or
   generating a braking recommendation.

9. The method as claimed in claim 6 further comprising:
   receiving a lesson request; and
   generating a practice route based on the lesson request.

10. The method as claimed in claim 6 further comprising:
    identifying a turn maneuver in a travel route; and
    wherein modifying the maneuver instruction includes:
    generating a position recommendation during the turn maneuver;
    generating a gear shift recommendation during the turn maneuver;
    generating a steering recommendation during the turn maneuver;
    generating a speed recommendation during the turn maneuver; or generating a braking recommendation during the turn maneuver.

11. A navigation system comprising:
    an instruction module, for generating a maneuver instruction for a driving maneuver, the maneuver instruction including an explanation of how to turn, merge, or park a driver's vehicle;
    a monitor module, coupled to the instruction module, for monitoring a maneuver attempt for a compliance to the maneuver instruction;
    a modify module, coupled to the monitor module, for modifying the maneuver instruction based on deviations of the maneuver attempt from the maneuver instruction;

a grade module, coupled to the modify module, for assigning a driver skill grade for the maneuver attempt based on the compliance to the maneuver instruction; and a feedback module, coupled to the grade module, for generating a training feedback to improve the driver skill grade of the maneuver attempt for displaying on a device.

12. The system as claimed in claim 11 further comprising:
a route module, coupled to the instruction module, for generating a travel route;
a difficulty module, coupled to the route module, for identifying a maneuver difficulty of the driving maneuver in the travel route as exceeding the driver skill grade; and
a detour module, coupled to the difficulty module, for generating a detour to the travel route having a driving maneuver conformant to the driver skill grade.

13. The system as claimed in claim 11 further comprising:
a lesson module, coupled to the instruction module, for receiving a lesson request for the driving maneuver; and
a route module, coupled to the lesson module, for generating a travel route to the driving maneuver closest to the driver's vehicle.

14. The system as claimed in claim 11 wherein the modify module is for modifying the maneuver instruction at an approaching stage, an entering stage, a middle stage, and an end stage of the driving maneuver.

15. The system as claimed in claim 11 wherein the modify module includes:
a speed module, coupled to the instruction module, for generating a speed recommendation;
a gear module, coupled to the speed module, for generating a gear shift recommendation;
a position module, coupled to the gear module, for generating a position recommendation;
a steering module, coupled to the position module, for generating a steering recommendation; and
a brake module, coupled to the steering module, for generating a braking recommendation.

16. The system as claimed in claim 11 further comprising a maneuver module, coupled to the instruction module, for scanning a travel route for the driving maneuver.

17. The system as claimed in claim 16 wherein the instruction module is for generating a location-specific instruction for the driving maneuver.

18. The system as claimed in claim 16 further comprising:
a maneuver module, coupled to the instruction module, for identifying a parking maneuver as the driving maneuver; and
wherein the modify module includes:
a position module, coupled to the instruction module, for generating a position recommendation;
a gear module, coupled to the position module, for generating a gear shift recommendation;
a steering module, coupled to the gear module, for generating a steering recommendation;
a speed module, coupled to the steering module, for generating a speed recommendation; and
a brake module, coupled to the speed module, for generating a braking recommendation.

19. The system as claimed in claim 16 further comprising:
a lesson module, coupled to the instruction module, for receiving a lesson request; and
a route module, coupled to the lesson module, for generating a practice route based on the lesson request.

20. The system as claimed in claim 16 further comprising:
a maneuver module, coupled to the instruction module, for identifying a turn maneuver in a travel route; and
wherein the modify module includes:
a position module, coupled to the instruction module, for generating a position recommendation;
a gear module, coupled to the position module, for generating a gear shift recommendation;
a steering module, coupled to the gear module, for generating a steering recommendation;
a speed module, coupled to the steering module, for generating a speed recommendation; and
a brake module, coupled to the speed module, for generating a braking recommendation.

* * * * *